(12) United States Patent
Sansom

(10) Patent No.: US 9,146,098 B2
(45) Date of Patent: Sep. 29, 2015

(54) ALIGNMENT HEAD SYSTEM

(75) Inventor: Mark David Sansom, Livingston (GB)

(73) Assignee: AKTIEBOLAGET SKF, Gothenburg (SE)

( * ) Notice: Subject to any disclaimer, the term of this patent is extended or adjusted under 35 U.S.C. 154(b) by 250 days.

(21) Appl. No.: 13/880,197

(22) PCT Filed: Oct. 19, 2010

(86) PCT No.: PCT/EP2010/006358
§ 371 (c)(1),
(2), (4) Date: Jun. 18, 2013

(87) PCT Pub. No.: WO2012/052036
PCT Pub. Date: Apr. 26, 2012

(65) Prior Publication Data
US 2013/0269194 A1    Oct. 17, 2013

(51) Int. Cl.
*G01B 11/27*    (2006.01)

(52) U.S. Cl.
CPC .............. *G01B 11/27* (2013.01); *G01B 11/272* (2013.01); *G01B 2210/58* (2013.01)

(58) Field of Classification Search
CPC ..................................................... G01B 11/272
USPC ..................... 33/412, 286; 356/153
See application file for complete search history.

(56) References Cited

U.S. PATENT DOCUMENTS

| | | | |
|---|---|---|---|
| 5,684,578 A | 11/1997 | Nower et al. | |
| 5,980,094 A | 11/1999 | Nower | |
| 7,301,616 B2 * | 11/2007 | Foley | 356/141.3 |
| 8,196,304 B1 * | 6/2012 | McBride | 33/412 |
| 2008/0201097 A1 | 8/2008 | Stromberg et al. | |
| 2014/0198312 A1 * | 7/2014 | Gitzen | 356/138 |

FOREIGN PATENT DOCUMENTS

EP    1577638 A2    9/2005

* cited by examiner

*Primary Examiner* — Christopher Fulton
(74) *Attorney, Agent, or Firm* — Bryan Peckjian; SKF USA Inc. Patent Dept.

(57) ABSTRACT

An alignment head system (1, 31) for taking alignment data with respect to a pair of shafts (4, 5) coupled to each other by means of a coupling (6) comprises a data acquisition device (11) configured to wirelessly receive data, and alignment heads (2, 3). Each alignment head (2, 3) is configured to take alignment data with respect to the shafts (4, 5), to wirelessly send the alignment data to the data acquisition device (11), and to forward alignment data received from the other alignment head (2, 3).

10 Claims, 2 Drawing Sheets

ALIGNMENT HEAD SYSTEM

CROSS-REFERENCE

This application is the U.S. national stage of International Application No. PCT/EP2010/006358 filed on Oct. 19, 2010, which is herein incorporated in its entirety.

FIELD OF THE INVENTION

The invention relates to an alignment head system.

DESCRIPTION OF THE RELATED ART

U.S. Pat. No. 5,684,578 discloses a laser alignment head system for taking alignment data with respect to a pair of coupled shafts. The alignment head system comprises two laser alignment heads, a central telemetry unit and a shaft alignment analyzer. Each alignment head includes a laser, a laser sensor, an angle sensor, a computer, and a transmitter for transmitting data from the laser alignment head. During operation, each computer produces output data corresponding to the position and rotational angle of its associated shaft. The relevant transmitter transmits the output data wirelessly to the central telemetry unit coupled to the shaft alignment analyzer.

SUMMARY OF THE INVENTION

It is an object of the present invention to provide an improved alignment head system.

The object is achieved in accordance with the invention by means of an alignment head system for taking alignment data with respect to a pair of shafts coupled to each other by means of a coupling, comprising a data acquisition device configured to wirelessly receive data, and alignment heads each configured to take alignment data with respect to the shafts, to wirelessly send the alignment data to the data acquisition device, and to forward alignment data received from the other alignment head.

The inventive alignment head system is meant to take alignment data with respect to a pair of shafts. During operation, the alignment heads gather the alignment data as it is known per se in the art. The alignment data may be indicative of the amount of displacement or movement that occurs between a projection coaxial to one of the shafts and the other, as the shafts are rotated through various degrees of rotation.

The alignment heads are further configured to send the alignment data wirelessly to the data acquisition device. The alignment heads may comprise appropriate wireless sending means and the data acquisition device may comprise appropriate receiving means. The data acquisition device may, for instance, be a mobile/portable computer.

Each alignment head is further configured to forward alignment data originated from the other alignment head. Therefore, the alignment data, which may be sent as data packets, can reach the data acquisition device directly from the alignment head having sent the relevant alignment data, or can be routed through the other alignment head. As a result, even though the direct link between the relevant alignment head and the data acquisition device may be disturbed or interrupted, the alignment data can still reliably reach the data acquisition device through the other alignment head, improving reliability of data exchange of the inventive alignment head system.

The alignment heads may be laser alignment heads at least one of which comprises a laser configured to generate a laser beam which emanates from the respective laser alignment head. The system might thus comprise only one alignment head with a laser, or the system might comprise alignment heads that both comprise a laser. In a one laser system the laser beam is sent in two different paths from the transmitter to the receiver instead of sending laser beams in each direction. Accuracy and reliability may be enhanced utilizing laser alignment heads for the inventive alignment head system.

In order to gather the alignment data, each alignment head may comprise at least one of the following: a position sensor, a rotation sensor, or both. Utilizing the position sensor and the rotational sensor, the alignment heads are able to collect data indicative of the amount of displacement or movement that occurs between a projection coaxial to one of the shafts and the other, as the shafts are rotated through various degrees of rotation.

The data acquisition device may also be configured to determine misalignment of the shafts in response to the received alignment data. Calculation methods for determination of the misalignment based on the received alignment data are well known in the art. Then, the information about the misalignment may be used to adjust the shaft with respect to position and/or orientation.

The inventive alignment head system may comprise at least one router configured to forward alignment data received from at least one of the alignment heads. Utilizing the router, an additional link for the alignment data from the relevant alignment head to the data acquisition device is provided, potentially decreasing the probability of an interrupted transmission of the alignment data from the relevant alignment head to the data acquisition device.

The inventive alignment head system may comprise at least one additional wireless measuring devices configured to gather measuring data and to forward alignment data received from at least one of the alignment heads. Therefore, the additional wireless measuring device provides an additional link for the alignment data.

Conventional wireless alignment head systems utilize only point-to-point wireless connection, i.e. only a direct link between the relevant alignment head and the data acquisition device. Depending on the embodiment, the inventive alignment head system, however, incorporates mesh networking technology into its alignment heads, providing an additional link between the alignment heads and the data acquisition device. This is particularly advantageous when using the inventive alignment head system in difficult working environments, such as aboard ships or on oil-rigs, etc., where there is an abundance of metalwork, inhibiting a reliable point-to point wireless connection between the alignment head and the data acquisition device. Consequently, the inventive alignment head system can be used for bigger sized machines to be aligned compared to conventional alignment head systems.

The inventive alignment head system, which may utilize low-power mesh networking technology, provides a more robust and reliable network to be created that may improve or even guarantee connections to all parts of the system even in relatively difficult industrial environments.

In order to have the alignment heads forward alignment data to the data acquisition device, wireless mesh network components may be added to or even incorporated into the alignment heads and maybe in the data acquisition device, allowing the alignment heads to act as routers. This means that the data connection from one alignment head to the data acquisition device can pass through another alignment head, helping to bridge the gap between the units where the far alignment head cannot communicate directly with the data acquisition device.

In one embodiment of the inventive alignment system, a dedicated router node may be introduced. The router or router node may be sited or mounted, for instance, magnetically in a suitable position to provide an alternative path for the wireless communications.

This scenario may be extended as required with further router nodes to allow multiple paths for the wireless traffic. The network may be able to self-heal should a path become too noisy, allowing the data to flow through an alternative path automatically.

The inventive alignment head system, which may constitute a wireless mesh network, may support many devices. The inventive alignment head system may comprise peripherals. For example, the use of wireless tape measures that can report their measurements or wireless torque meters that can provide the torque value of a bolt directly to the data acquisition device over the wireless network may be used.

DESCRIPTION OF EMBODIMENTS

Figure 1:
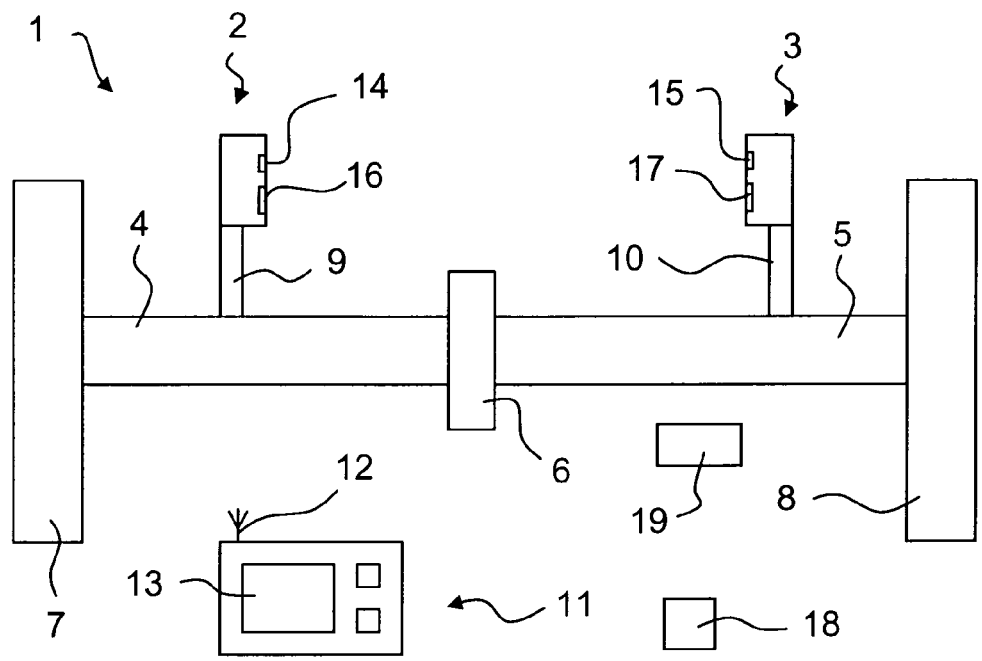
FIG. 1 is a laser alignment head system comprised of a pair of laser alignment heads.
Figure 2:
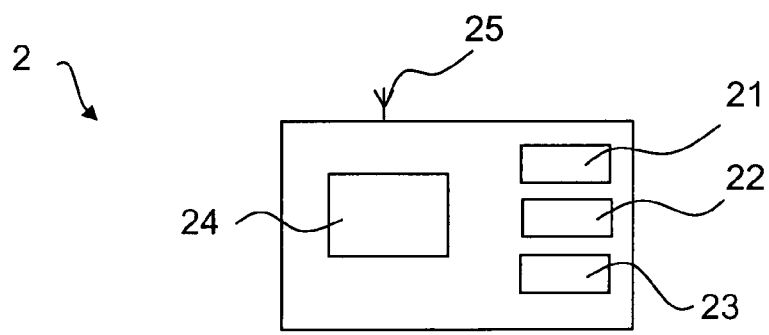
FIG. 2 is a schematic block diagram of one of the alignment heads.

FIG. 1 shows an alignment head system, which may be a laser alignment head system 1 comprised of first and second laser alignment heads 2, 3. FIG. 2 depicts a schematic block diagram of the first laser alignment head 2 which is similar to the second alignment head 3.

The laser alignment head system 1 is configured to take alignment data with respect to a pair of shafts 4, 5 coupled to each other by means of a coupling 6. The shafts 4, 5 are connected to respective machines 7, 8, such as a motor driving, for instance, a pump through the coupling 6. The first and second laser alignment head 2, 3 are mounted on the shafts 4, 5, for instance, by means of appropriate mounting systems 9, 10, as it is generally know in the art.

The alignment head system 1 further comprises a data acquisition and calculation device configured to receive and process data from the laser alignment heads 2, 3. The data gathered by the laser alignment heads 2, 3 may comprise the amount of displacement or movement that occurs between a projection coaxial to one shaft 4 and the other shaft 5, as the shafts 4, 5 are rotated through various degrees of rotation. Then, based upon calculation methods well known in the art, misalignment of the shaft 4, 5 may be calculated. Once the misalignment has been calculated, further known methods may be used to calculate the horizontal machine moves, i.e. horizontal movements of, for instance, the feet of one or both of the machines 7, 8, or the vertical machine moves, i.e. placement of, for instance, shims underneath the feet of the machines 7, 8, necessary to bring the shafts 4, 5 back into alignment. The data acquisition and calculation device may be a portable/mobile computer 11 which comprises a wireless receiver 12 and a computation unit, for instance, a processor 13.

As shown in FIG. 2, each laser alignment head 2, 3 comprises a laser 21 configured to generate a laser beam which emanates from the respective laser alignment head 2, 3 through apertures 14, 15. Additionally, each laser alignment head 2, 3 comprises a sensor window 16, 17 through which the laser beam emitted by the opposing laser alignment head 2, 3 is received.

In addition, each laser alignment head 2, 3 comprises a position sensor 22, a rotation sensor 23, a computational unit, for instance, a micro processor 24, and a transmitter 25 connected to the processor 24 and configured to wirelessly send and receive data.

During operation, the position sensors 22 of the laser alignment heads 2, 3 are configured to sense one or more coordinates, such as the X and Y coordinates, of the laser beam striking the relevant position sensor 22 through the relevant sensor window 16, 17 and to generate electric signals corresponding to the coordinates. These electrical signals, which may be digitized by appropriate A/D converters not explicitly shown in the figures, are inputted to the processor 24 of the relevant laser alignment head 2, 3.

The rotation sensors 23 are configured to determine the angular position of its laser alignment head 2, 3. The rotational position sensors 22 generate electric signals corresponding to the rotational orientation of the relevant laser alignment head 2, 3 and provide these signals to the relevant processor 24.

The processors 24 may be configured to process the electrical signals generated by the position and rotational sensors 22, 23, i.e. information about the X and Y position and the rotational position information, for instance, by utilizing calibration values stored on board. The processed electrical signals are forwarded to the respective transmitter 25 which is configured to wirelessly send the position information to the mobile computer 11 which receives the information with its wireless receiver 12.

The processor 13 of the computer 11 may be configured to calculate the amount of misalignment in the shafts 2, 3 based on the received data and to determine how the machines 7, 8 need to be adjusted in order to achieve a better or even an optimal shaft alignment.

For the example embodiment, each laser alignment head 2, 3 is configured to have routing capabilities. Therefore, each laser alignment head 2, 3 is not just configured to send its data to the computer 11 directly, but is also configured to receive the data, which is sent by the opposing laser alignment head 2, 3 and is meant for the computer 11, and to forward it. The laser alignment heads 2, 3 may also be configured to receive and forward data sent by the computer 11 and meant for the opposing laser alignment head 2, 3. In order to have routing capabilities, the transmitters 25 may also be configured to receive signals and the processors 24 of the laser alignment heads 2, 3 may each be configured to have routing capabilities. Consequently, if one of the laser alignment heads 2, 3 is out of reach of the computer 11, data sent from this laser alignment head 2, 3 can be received by the opposing laser alignment head 2, 3 and forwarded to the mobile computer 11.

The laser alignment head system 1 may thus constitute a wireless ad-hoc network whose nodes are the laser alignment heads 2, 3 and the computer 11. In general, a wireless ad-hoc network is a decentralized wireless network. The network is ad hoc because it does not rely on a preexisting infrastructure, such as routers in wired networks or access points in managed wireless networks. Instead, each node participates in routing by forwarding data for other nodes, and so the determination of which nodes forward data is made dynamically based on the network connectivity.

Particularly, the laser alignment head system 1 may constitute a wireless mesh network. A wireless mesh network is a communications network made up of wireless nodes particularly organized in a mesh topology. The nodes made up of the laser alignment heads 2, 3 are configured to forward traffic to and, depending on the configuration, from the mobile computer 11.

Figure 3:
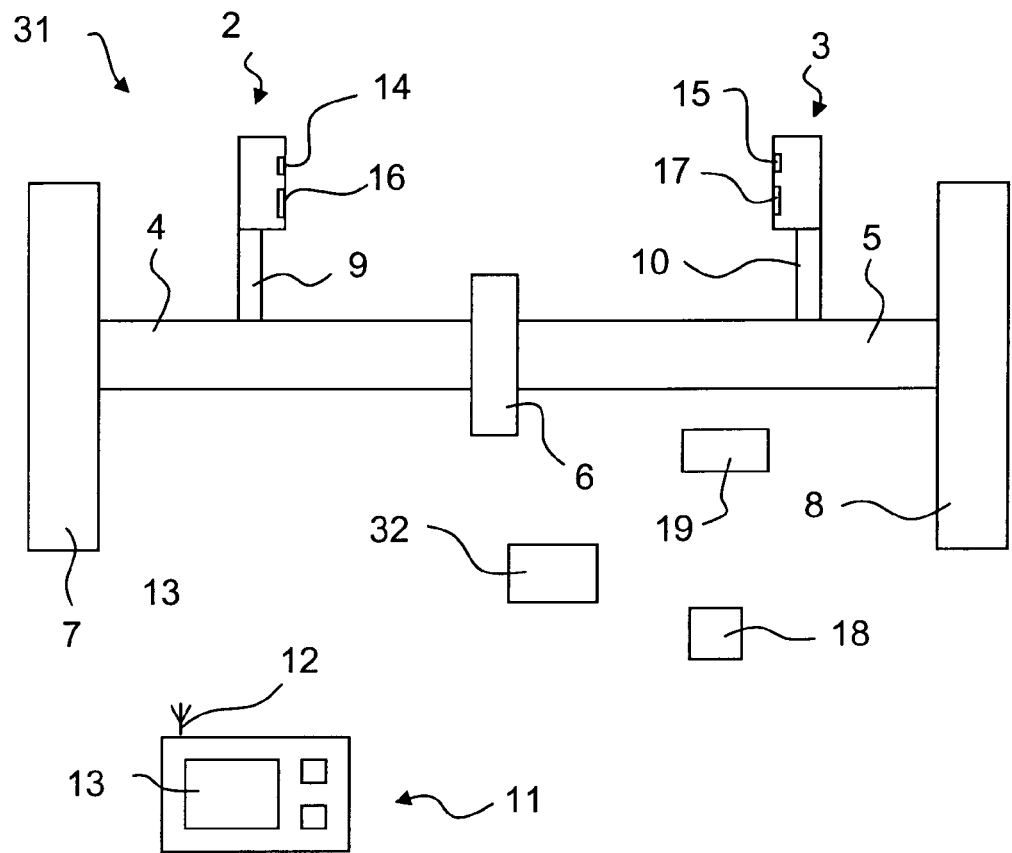
FIG. 3 is a further laser alignment head system.

FIG. 3 shows a further alignment head system, particularly a further laser alignment head system 31 which can be used to take alignment data with respect to the pair of shafts 4, 5 coupled to each others by means of the coupling 6.

The laser alignment head system 31 of FIG. 3 comprises the first and second laser alignment heads 2, 3 and the mobile computer 11, as well as at least one router 32 configured to forward signals sent by the laser alignment heads 2, 3 and meant for the computer 11. Thus, signals or data sent by one of the laser alignment heads 2, 3 can either reach the mobile computer 11 directly, through the opposing laser alignment head 2, 3, or through the router 32. The router 32 may be sited or mounted, for instance, magnetically in a suitable position.

It is also possible to incorporate one or more peripheral devices, for instance, a wireless tape measure device 18 configured to report its measurements, for instance, to the computer 11 or a wireless torque meter 19 configured to provide a torque value of, for instance, a bolt directly to the mobile computer 11 over the wireless network.

Although modifications and changes may be suggested by those skilled in the art, it is the intention of the inventors to embody within the patent warranted hereon all changes and modifications as reasonably and properly come within the scope of their contributions to the art.

LIST OF REFERENCE SIGNS 1 laser alignment head system
2, 3 laser alignment head
4, 5 shaft
6 coupling
7, 8 machine
9, 10 mounting system
11 computer
12 receiver
13 processor
14, 15 aperture
16, 17 window
18 tape measure device
19 torque meter
21 laser
22 position sensor
23 rotation sensor
24 processor
25 transmitter
31 laser alignment head system
32 router

The invention claimed is:

1. An alignment head system for taking alignment data with respect to a pair of shafts coupled to each other by a coupling, the alignment head system comprising:
   a data acquisition device configured to wirelessly receive data, and
   alignment heads each configured to take alignment data with respect to the shafts, to wirelessly send the alignment data to the data acquisition device, and to forward alignment data received from the other alignment head.

2. The alignment head system of claim 1, wherein each alignment head is configured to be mounted on the shafts.

3. The alignment head system of claim 1, wherein the alignment heads are laser alignment heads at least one of which includes a laser configured to generate a laser beam which emanates from the respective laser alignment head.

4. The alignment head system of claim 1, wherein each alignment head includes at least one of a position sensor and a rotation sensor.

5. The alignment head system of claim 1, wherein the data acquisition device is configured to determine misalignment of the shafts in response to the received alignment data.

6. The alignment head system of claim 1, further comprising at least one router configured to forward alignment data received from at least one of the alignment heads.

7. The alignment head system of claim 1, further comprising at least one additional wireless measuring devices configured to gather measuring data and to forward alignment data received from at least one of the alignment heads.

8. The alignment head system of claim 1, wherein the alignment heads comprise a first alignment head coupled to a first one of the pair of shafts and a second alignment head coupled to a second one of the pair of shafts.

9. The alignment system of claim 8, wherein:
   the first alignment head comprises a first data transmitter;
   the second alignment head comprises a second data transmitter;
   the first data transmitter is in wireless communication with the second data transmitter and with the data acquisition device; and
   the second data transmitter is also in communication with the data acquisition device.

10. The alignment system of claim 9, wherein the first data transmitter is configured to transmit alignment data received from the second data transmitter to the data acquisition device, and wherein the second data transmitter is configured to transmit alignment data received from the first data transmitter to the data acquisition device, such that the first data transmitter, the second data transmitter, and the data acquisition system define a mesh network.

* * * * *